United States Patent [19]

Carleton

[11] 4,004,973
[45] Jan. 25, 1977

[54] NEUTRONIC REACTOR

[75] Inventor: John T. Carleton, Elsmere, Del.

[73] Assignee: The United States of America as represented by the United States Energy Research and Development Administration, Washington, D.C.

[22] Filed: Aug. 28, 1952

[21] Appl. No.: 306,824

[52] U.S. Cl. .................................... 176/84
[51] Int. Cl.² ........................................ G21C 5/00
[58] Field of Search .................. 204/154.2; 176/84

[56] References Cited
UNITED STATES PATENTS

| 996,926 | 7/1911 | Harrington | 122/6 A |
| 2,267,864 | 12/1941 | Hosbein | 122/6 A |
| 2,467,069 | 4/1949 | Wright | 122/6 A |

Primary Examiner—Harvey E. Behrend
Attorney, Agent, or Firm—Dean E. Carlson; Arthur A. Churm; Marshall A. Burmeister

[57] ABSTRACT

A graphite-moderated nuclear reactor includes channels between blocks of graphite and also includes spacer blocks between adjacent channeled blocks with an axis of extension normal to that of the axis of elongation of the channeled blocks to minimize changes in the physical properties of the graphite as a result of prolonged neutron bombardment.

3 Claims, 6 Drawing Figures

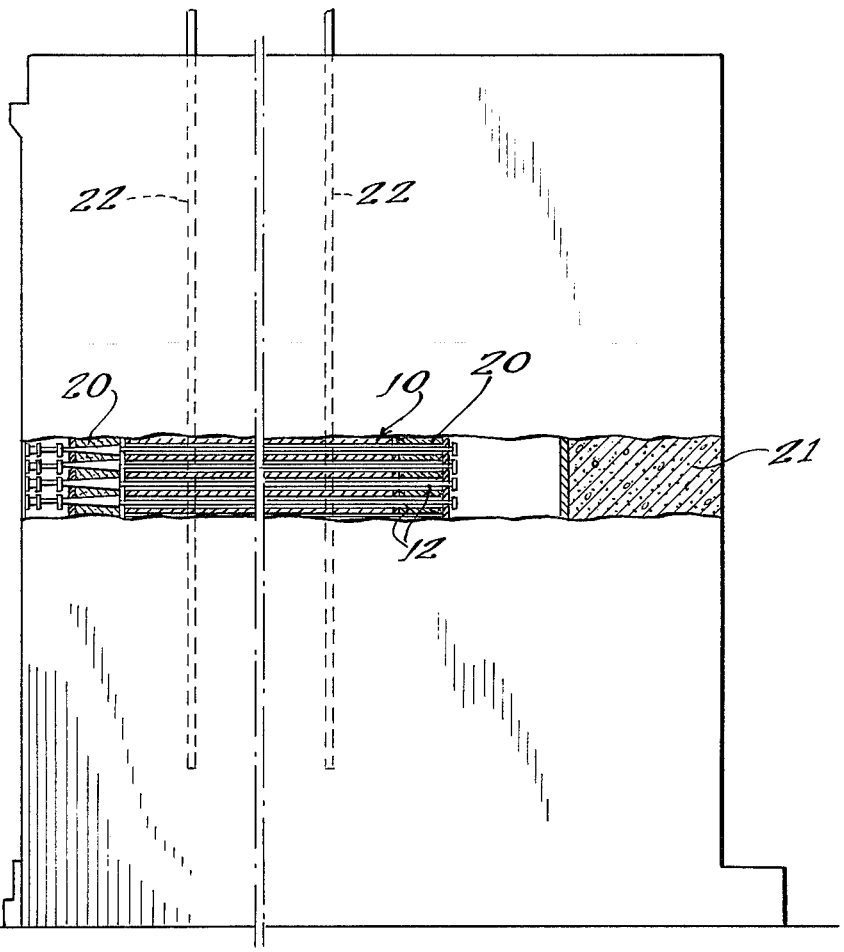
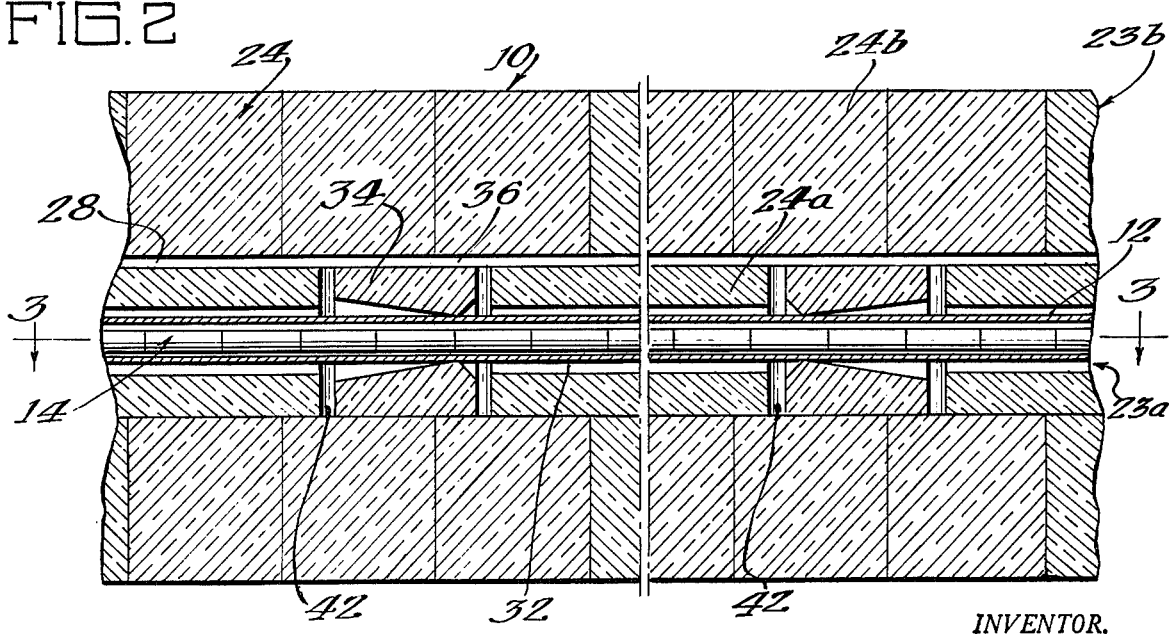

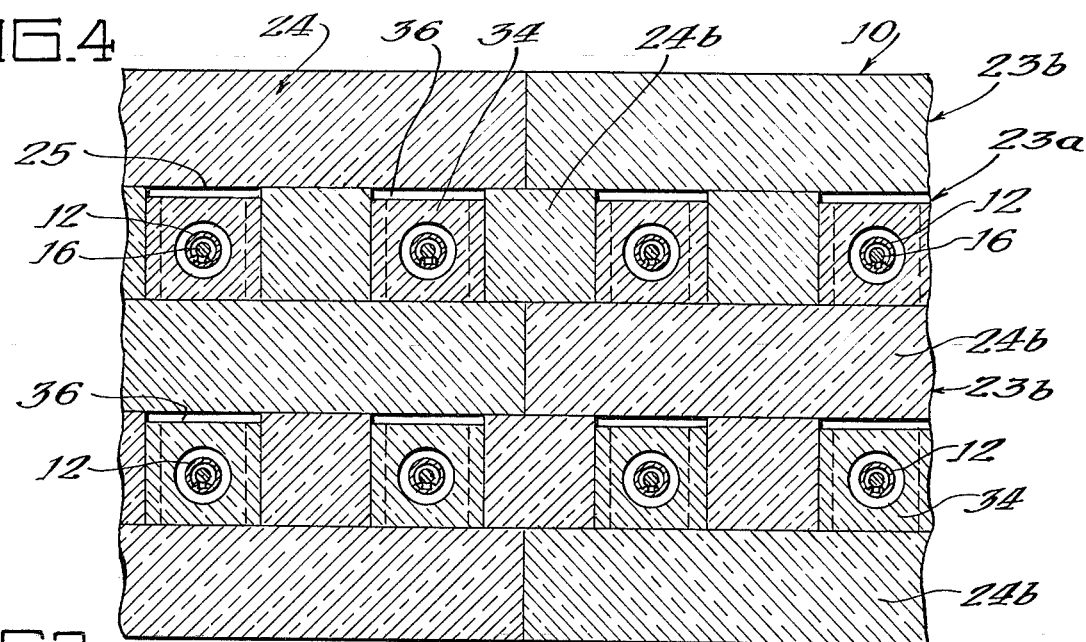
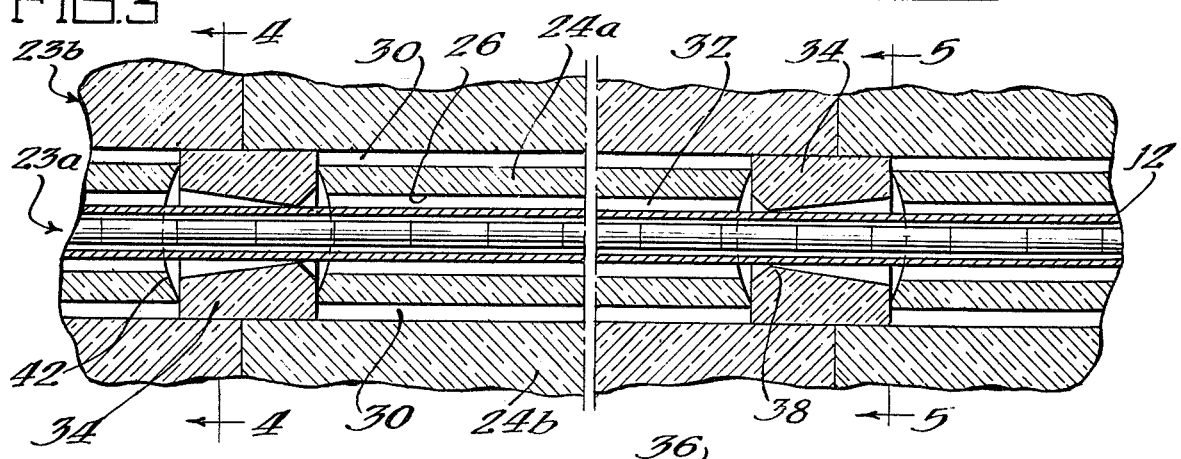
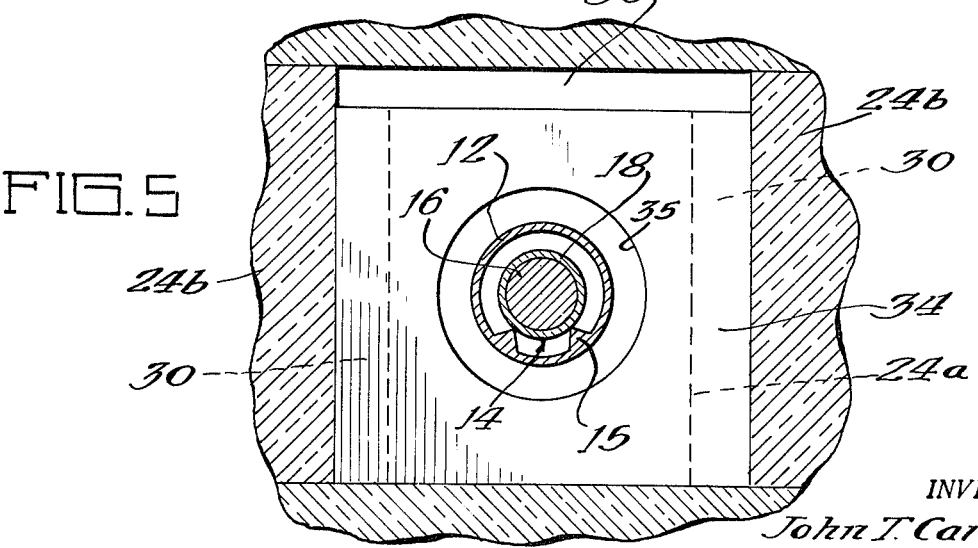
INVENTOR.
John T. Carleton
BY
Roland A. Anderson
Attorney

NEUTRONIC REACTOR

The present invention relates to neutronic reactors employing moderators constructed of crystalline materials, and specifically to such reactors constructed to minimize the changes in the physical properties of the moderators as a result of prolonged neutron bombardment thereof.

It has been found that prolonged operation of a neutronic reactor with a solid moderator will cause changes in the physical properties of the material of the moderator, particularly when the reactor is operated at a relatively high power level. Among the changes which occur in the moderator, expansion presents the most immediate problems, since distortion of the shape of the reactor as a result of expansion seriously limits the life of the reactor. Extruded moderator materials expand normal to the axis of the extrusion of the material. For this reason, reactors, have been constructed with spaces provided adjacent to blocks of moderator material on the sides parallel to the axes of extrusion of the blocks, as described in the copending application of John T. Carleton, Ser. No. 157,287, filed Apr. 21, 1950, now U.S. Pat. No. 3,200,046, dated Aug. 10, 1965.

The changes in the physical properties of solid materials as a result of prolonged high energy neutron bombardment are believed to be due to distortion of the crystalline lattice structure of such materials. When a neutron strikes one of the atoms of a crystal, the bonds which tie the atoms of the crystal together are placed under severe strain, and under certain conditions one of the atoms will be displaced from its position in the lattice structure. This may merely cause rearrangement of the atoms in the lattice structure of the crystal, or it may result in the bombarded atom entirely leaving the lattice structure and taking up a permanent interstitial position. This latter process is believed to be the one which occurs when crystalline materials expand due to neutron bombardment.

While a reactor constructed in accordance with the disclosure of the copending application of John T. Carleton, referred to above, restrains the overall expansion of a solid moderator to permissible limits, such reactors are difficult to construct. In order to provide spaces adjacent to the blocks of the moderator material on the sides parallel to the axes of extrusion thereof, it is necessary to carefully place each block in the proper place in the moderator, requiring careful and frequent measurements.

It is an object of the present invention to construct a neutronic reactor with a solid moderator in which the overall expansion of the moderator will be maintained within permissible limits with prolonged use and which is relatively easy to construct.

A further object of the present invention is to provide a neutronic reactor having a block moderator provided with spaces adjacent to the blocks on the sides parallel to the axes of extrusion of the blocks which may readily be assembled without necessitating careful and frequent measurements in order to provide proper widths for the spaces.

Further objects and advantages of the present invention will be readily apparent to the man skilled in the art from a further reading of the present specification, particularly when viewed in the light of the drawings, in which:

FIG. 1 is an elevational view, partly cut away and in section, of a neutronic reactor constructed according to the teachings of the present invention;

FIG. 2 is an enlarged sectional view of a fragment of the reactor shown in FIG. 1;

FIG. 3 is an enlarged fragmentary sectional view of a portion of the neutronic reactor taken along line 3—3 of FIG. 2;

FIG. 4 is a fragmentary sectional view taken along line 4—4 of FIG. 3;

FIG. 5 is a further enlargment of a fragment of the neutronic reactor taken along line 5—5 of FIG. 3; and FIG. 6 is a fragmentary enlarged view of a portion of the neutronic reactor shown in FIG. 1.

The neutronic reactor shown in the figures is constructed with a moderator 10 of crystalline materials, such as graphite. A plurality of coolant tubes 12 traverse the moderator 10 parallel to each other. Fuel elements 14 are mounted within the coolant channels 12 on ribs 15. The fuel elements 14 are constructed with bodies 16 of thermal neutron fissionable material, such as natural uranium, enclosed in protective jackets 18. The jackets 18 may be constructed of any material having a small neutron capture cross section and suitable physical properties, such as a high melting point and resistance to corrosion. Aluminum has been found to be satisfactory for the jackets 18. A radiation shield 20 surrounds the moderator 10, and is constructed of materials having high neutron and radiation capture cross sections, such as boron steel. An additional shield 21 of concrete is disposed further from the moderator 10 to further protect operating personnel. Control rods 22 constructed of material having high neutron capture cross sections, such as cadmium or boron are slidably disposed within the moderator 10, and may be withdrawn to further increase the neutronic chain reaction.

The construction and requirements for neutronic reactors of the type generally described are well understood by the man skilled in the art and form no part of the present invention. The patent applications of Edward C. Creutz, Leo. A. Ohlinger, Alvin M. Weinberg, Eugene P. Wigner, and Gale J. Young, Ser. No. 574,153, filed Jan. 23, 1945, now U.S. Pat. No. 2,910,419, dated Oct. 27, 1959, and Enrico Fermi and Leo Szilard, Ser. No. 568,904, field Dec. 19, 1944, now U.S. Pat. No. 2,708,656, dated May 17,1955, fully describe operative neutronic reactors of the type described above.

The moderator 10 is constructed of a plurality of layers 23a and b of rectangular blocks 24, adjacent layers 23a and b of blocks 24 having their longitudinal axes normal to each other. The coolant tubes 12 are disposed in alternate layers 23a of blocks 24, the coolant tubes 12 being disposed in channels 26 in tube bearing blocks 24a. The layers 23a are disposed between parallel planes formed by the adjacent layers 23b of solid blocks 24b. The tube bearing blocks 24a in each layer are separated by solid blocks 24b, the solid blocks 24b being identical with the blocks 24b in the layers 23b which do not contain coolant tubes 12.

The tube bearing blocks 24a have smaller cross sections than the solid blocks 24b, and are also slightly shorter. However, the tube bearing blocks 24a are disposed in channels 25 having sufficient cross section to contain the solid blocks 24b, thus leaving gaps 28 between the tops of the tube bearing blocks 24a and the adjacent layer 23b of blocks 24b. Spaces 30 are also provided in this manner between the sides of the tubes bearing blocks 24a and the blocks 24b in the same layer 23a, as shown in FIGS. 3 through 5. Further, the channel 26 within the tube bearing blocks 24a has a greater diameter than the coolant tubes 12, thereby leaving a gap 32 between the coolant tubes 12 and the tube bearing blocks 24a. The axes of extrusion of the tube bearing blocks 24a is longitudinal, or parallel to the direction of the coolant tubes 12.

Along the length of each coolant tube 12, spacer blocks 34 are disposed between adjacent tube bearing blocks 24a. The spacer blocks 34 have the same height as the tube bearing blocks 24a, but have a width equal to that of the solid blocks 24b, as shown in FIGS. 2 through 5. As a result, the spacer blocks 34 abut against adjacent solid blocks 24b in the same layer 23a, but a spacer 36 is provided between the spacer blocks 34 and the solid blocks 24b in the above layer 23b, as shown in FIGS. 2 through 5. Further, the spacer blocks 34 are provided with axes of extrusion normal to the direction of the coolant tubes 12, thus normal to the axes of extrusion of the tube bearing blocks 24a. The spacer blocks 34 are provided with channels 35 extending therethrough, these channels 35 tapering in from both ends and form an annulus 38 with a diameter approximately the same as that of the outer diameter of the coolant tube 12. The coolant tubes 12 are thus supported upon the annuli 38 of the spacer blocks 34.

The ends of the tube bearing blocks 24a are fluted so that only the edges thereof are in contact with the spacer blocks 34, thus leaving an aperture 42 between the spacer blocks 34 and the tube bearing blocks 24a. It is also to be noted, that the combined length of one tube bearing block 24a and one spacer block 34 equals the length of one solid block 24b, so that the solid blocks 24b adjacent to tube bearing blocks 24a in each layer 23a have ends abutting spacer blocks 34, as shown in FIG. 3, thus securing solid blocks 24b in position and maintaining the spaces 30.

Since the expansion of the moderator 10 occurs primarily in the tube bearing blocks 24a due to the higher fast neutron density in the regions adjacent to the fuel elements 14, the greatest proportion of the moderator expansion will be in these blocks 24a. This expansion also occurs normal to the axes of extrusion of the blocks 24a, and gaps 28 and 30 are adequate to accommodate this expansion. Any longitudinal expansion of the tube bearing blocks 24a will be in the regions nearest to the fuel elements 14, and hence the apertures 42 will be sufficient to accommodate this expansion.

The spacer blocks 34 are short relative to the tube bearing blocks 24a and solid blocks 24b, so that expansion parallel to the extrusion axes of these blocks can be neglected. Expansion normal to the axes of extrusion of the spacer blocks 34 can be accommodated by the spacer 36 provided above the spacer blocks 34. However, a certain amount of expansion normal to the axis of extrusion of the spacer blocks 34 must be accommodated by the apertures 42 also, since this expansion will be in a direction parallel to the coolant tubes 12. It is primarily to accommodate the expansion of the spacer blocks 34 along the length of the coolant tubes 12 that apertures 42 have been provided.

It will be noted that gap 32 between the tube bearing blocks 24a and the coolant tubes 12 is for the purpose of providing thermal insulation between the coolant tubes 12 and the tube bearing blocks 24a. As a result of this construction, the tube bearing blocks 24a will operate at a higher temperature, since less heat will be free to flow from the tube bearing blocks 24a to the coolant tube 12 and be carried away by the coolant flowing therethrough. Expansion of the moderator 10 is reduced as a result of higher operating temperatures, as disclosed in the copending patent application of Alfred A. Johnson and John T. Carleton, Ser. No. 253,908, filed Oct. 30, 1951.

A certain amount of expansion along the length of the coolant tubes 12 may occur in spite of the apertures 42 between the spacer blocks 34 and the tube bearing blocks 24a. For that reason, a gap 40 is provided between the shield 20 and the moderator 10, as shown in FIG. 6.

In one construction of the present invention, the graphite blocks 24b have a rectangular cross section of 4.18 inches and a longitudinal length of approximately 4 feet. The tube bearing blocks 24a have cross sections reduced to 4.06 inches on a side. The gap 40 between the moderator 10 and the shield 20 is 4 inches at its greatest point. Each of the coolant channels 12 is spaced 8⅝ inches from adjacent coolant channels in a rectangular lattice, as illustrated in FIG. 4. The graphite moderator 10 is a cube approximately 25 feet on a side.

It will be seen that the reactor described above may be readily assembled without the necessity of making frequent measurements in order to stack the graphite blocks 24a and 24b. Further, the neutronic reactor described utilizes a solid moderator of crystalline material in which overall expansion with prolonged use has been held to permissible limits.

The man skilled in the art will readily devise many other uses and modifications for the present invention, and hence it is intended that the scope of the invention be not limited to the specific disclosures herein, but rather only by the appended claims.

What is claimed is:

1. A neutronic reactor comprising, in combination, a solid moderator constructed of longitudinally extruded rectangular blocks of graphite stacked in abutting relationship in layers, the axes of extrusion of the blocks in successive layers being normal to each other, alternate layers having rows of blocks provided with longitudinal channels therein disposed in end to end relationship forming ducts through the moderator, said rows of channeled blocks being separated by rows of solid blocks, said channeled blocks having smaller dimensional cross sections and shorter lengths than the adjacent solid blocks in the same layer and concave ends, and spacer blocks of graphite disposed in abutting relationship between successive channeled blocks in each row of channeled blocks, said spacer blocks having channels therein tapering in from each side forming an annulus, said channels in the spacer blocks being aligned with the channels in the channeled blocks in each row to form a continuous duct through the moderator, the axes of extrusion of said spacer blocks being normal to that of the channeled blocks in said row, said spacer blocks being the same width as the solid blocks and the same height as the channeled blocks, and the combined length of one channeled block and one spacer block equaling the length of a solid block, the ends of said solid blocks in rows adjacent to channeled blocks terminating adjacent to spacer blocks, tubes disposed within the ducts, and material fissionable by neutrons of thermal energy disposed within the tubes.

2. A neutronic reactor comprising, in combination, a solid moderator constructed of longitudinally extruded rectangular blocks of graphite stacked in abutting relationship in layers, the axes of extrusion of the blocks in successive layers being normal to each other, alternate layers having rows of blocks provided with longitudinal channels therein disposed in end to end relationship forming ducts through the moderator, said rows of channeled blocks being separated by rows of solid blocks, said channeled blocks having smaller dimensional cross sections and shorter lengths than the adjacent solid blocks in the same layer, and spacer blocks of graphite disposed in abutting relationship between successive channeled blocks in each row of channeled blocks, said spacer blocks having channels therein aligned with the channels in the channeled blocks in each row to form a continuous duct through the moderator, the axes of extrusion of said spacer blocks being normal to that of the channeled blocks in said row, said spacer blocks abutting the adjacent solid blocks in the same layer at their ends normal to their axes of extrusion, tubes disposed within the ducts, and material fissionable by neutron thermal energy disposed within the tubes.

3. A neutronic reactor comprising, in combination, a moderator containing a layer of solid longitudinally extruded rectangular blocks of graphite disposed in parallel relationship between a pair of parallel planes within the moderator, alternate rows of blocks having longitudinal channels therein, said rows of channeled blocks being separated by rows of solid blocks, said channeled blocks having smaller dimensional cross sections than the adjacent solid blocks in the layer, and each row of channeled blocks being disposed in the same space as a row of solid blocks, and extruded spacer blocks of graphite disposed in abutting relationship between successive channeled blocks in each row of channeled blocks, said spacer blocks having channels therein aligned with the channels in the channeled blocks in each row to form a continuous duct through the moderator, the axes of extrusion of said spacer blocks being normal to that of the channeled blocks in said row, said spacer blocks abutting the solid blocks in the adjacent rows at their ends normal to their axes of extrusion, tubes disposed within the ducts, and material fissionable by neutrons of thermal energy disposed within the tubes.

* * * * *